United States Patent
Urai

(10) Patent No.: US 12,406,294 B2
(45) Date of Patent: Sep. 2, 2025

(54) PRODUCT PROPOSAL DEVICE, PRODUCT PROPOSAL SYSTEM, PRODUCT PROPOSAL METHOD, AND RECORDING MEDIUM

(71) Applicant: NEC Corporation, Tokyo (JP)

(72) Inventor: Hideo Urai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 270 days.

(21) Appl. No.: 18/122,526

(22) Filed: Mar. 16, 2023

(65) Prior Publication Data
US 2023/0410178 A1    Dec. 21, 2023

(30) Foreign Application Priority Data
Jun. 17, 2022  (JP) .................................. 2022-097830

(51) Int. Cl.
*G06Q 30/00*   (2023.01)
*G06Q 30/0601*   (2023.01)

(52) U.S. Cl.
CPC ................................ *G06Q 30/0631* (2013.01)

(58) Field of Classification Search
CPC ............................................... G06Q 30/06–08
See application file for complete search history.

(56) References Cited

U.S. PATENT DOCUMENTS

| 2016/0012194 A1* | 1/2016 | Prakash | G06Q 30/0601 705/2 |
| 2016/0212389 A1* | 7/2016 | Mehrotra | A61J 7/04 |
| 2018/0211208 A1* | 7/2018 | Winkle | H04L 12/2827 |
| 2019/0018932 A1* | 1/2019 | Groarke | G06Q 20/145 |

FOREIGN PATENT DOCUMENTS

JP    2021-099759 A    7/2021

OTHER PUBLICATIONS

Machine translation of JP7048565 B2 downloaded from espacenet.com (Year: 2021).*

* cited by examiner

*Primary Examiner* — Ethan D Civan
(74) *Attorney, Agent, or Firm* — Sughrue Mion, PLLC

(57) ABSTRACT

A product proposal device according to the present disclosure includes: an information acquisition means configured to acquire a usage status of arrangement drugs arranged in a customer's home and a drug purchase history; a proposal means configured to propose arrangement drugs to be arranged in the customer's home based on the usage status and the purchase history; and an output means configured to output a list of the proposed arrangement drugs.

6 Claims, 13 Drawing Sheets

Fig.3

CUSTOMER NAME: A

| CATEGORY | PRODUCT NAME |
|---|---|
| COLD DRUG | A |
| GASTROINTESTINAL DRUG | B |
| INTESTINAL REGULATION/ CONSTIPATION DRUG | C |
| EXTERNAL DRUG FOR SKIN | D |
| EYE DROP | E |
| SUPPLEMENT | F |

Fig.4

CUSTOMER NAME: A

| CATEGORY | PRODUCT NAME | REASON FOR ARRANGEMENT |
|---|---|---|
| COLD DRUG | A | CHANGE OF PRODUCT |
| GASTROINTESTINAL DRUG | B | EXCHANGE OF PRODUCT |
| INTESTINAL REGULATION/ CONSTIPATION DRUG | C | REPLENISHMENT OF PRODUCT |
| EXTERNAL DRUG FOR SKIN | D | REPLENISHMENT OF PRODUCT |
| EYE DROP | E | CHANGE OF PRODUCT |
| SUPPLEMENT | F | REPLENISHMENT OF PRODUCT |

Fig.9

CUSTOMER NAME: B

| CATEGORY | PRODUCT NAME |
|---|---|
| EXTERNAL DRUG FOR SKIN | D |
| SUPPLEMENT | F | a b

PLEASE RECOMMEND COSMETIC PRODUCT EFFECTIVE FOR ROUGH SKIN OR COSMETIC PRODUCT HIDING ROUGH SKIN

Fig.12

CUSTOMER NAME: B

| CATEGORY | PRODUCT NAME |
|---|---|
| EXTERNAL DRUG FOR SKIN | D |
| SUPPLEMENT | F |

CANDIDATE FOR REPLENISHMENT OF SUPPLEMENT F

| CANDIDATE FOR REPLENISHMENT | EXPIRATION DATE |
|---|---|
| C | OCTOBER 2022 |
| D | DECEMBER 2022 |

PRODUCT PROPOSAL DEVICE, PRODUCT PROPOSAL SYSTEM, PRODUCT PROPOSAL METHOD, AND RECORDING MEDIUM

This application is based upon and claims the benefit of priority from Japanese Patent Application No. 2022-097830, filed on Jun. 17, 2022, the disclosure of which is incorporated herein in its entirety by reference.

TECHNICAL FIELD

The present disclosure relates to a product proposal device, a product proposal system, a product proposal method, and a recording medium.

BACKGROUND ART

There is a drug arrangement service under which a drug box is placed in a home or an office and payment is made only for used drugs. In this service, there is a technology capable of proposing a type of an arrangement drug to be arranged in a customer's home.

For example, JP 2021-099759 A discloses that information regarding a group of products that should have originally been arranged as arrangement drugs but have not yet been arranged is provided to a person in charge of visit using a usage status of arrangement drugs, a purchase history, and the like.

SUMMARY

An example of the effect of the present disclosure is to provide a product proposal device capable of causing customers to use more arrangement drugs.

A product proposal device according to an example aspect of the present disclosure comprising:
 a memory storing instruction; and
 one or more processor configured to execute the instructions to:
 acquire a usage status of arrangement drugs arranged in a customer's home and a drug purchase history;
 propose arrangement drugs to be arranged in the customer's home based on the usage status and the purchase history; and
 output a list of the proposed arrangement drugs.

A product proposal system according to an example aspect of the present disclosure includes the above-described product proposal device; a camera; and an image analysis device, wherein the camera is provided in a drug box of the customer's home to capture an image of the inside of the drug box captured while the drug box is open, the image analysis device specifies a usage status of arrangement drugs in the customer's home by collating an image of the inside of the drug box captured immediately before the drug box is closed with an image of the inside of the drug box captured when arrangement drugs are replenished, and the information acquisition means acquires the specified usage status.

A product proposal method according to an example aspect of the present disclosure includes: acquiring a usage status of arrangement drugs arranged in a customer's home and a drug purchase history; proposing arrangement drugs to be arranged in the customer's home based on the usage status and the purchase history; and outputting a list of the proposed arrangement drugs.

A non-transitory recording medium stores a program for causing a computer to execute: acquiring a usage status of arrangement drugs arranged in a customer's home and a drug purchase history; proposing arrangement drugs to be arranged in the customer's home based on the usage status and the purchase history; and outputting a list of the proposed arrangement drugs.

BRIEF DESCRIPTION OF THE DRAWINGS

Exemplary features and advantages of the present invention will become apparent from the following detailed description when taken with the accompanying drawings in which:

FIG. 3 is an example of a screen on which a list of arrangement drugs is output in the first example embodiment;

FIG. 4 is another example of a screen on which a list of arrangement drugs is output in the first example embodiment;

FIG. 9 is an example of a screen output by an output unit in the second example embodiment;

FIG. 12 is an example of a screen output by an output unit in the third example embodiment.

EXAMPLE EMBODIMENT

Next, example embodiments will be described in detail with reference to the drawings.

Figure 1:
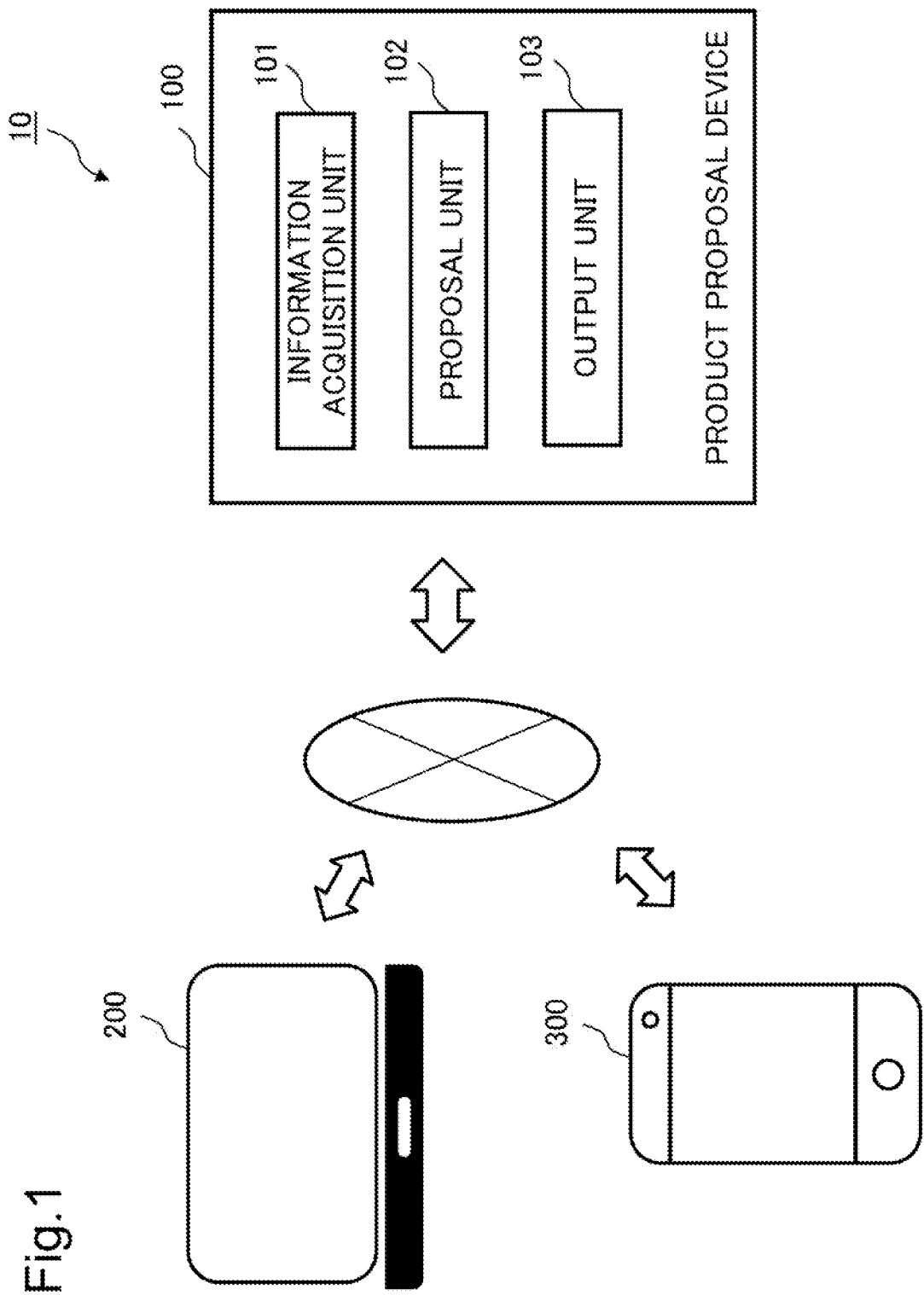
FIG. 1 is a block diagram illustrating a configuration of a product proposal system including a product proposal device according to a first example embodiment.

FIG. 1 is a block diagram illustrating a configuration of a product proposal system including a product proposal device according to a first example embodiment. As illustrated in FIG. 1, a product proposal system 10 includes a product proposal device 100, a person-in-charge terminal 200, and a customer terminal 300. In addition, the product proposal device 100 according to the present example embodiment includes an information acquisition unit 101, a proposal unit 102, and an output unit 103.

The product proposal device 100 according to the present example embodiment proposes an arrangement drug to be replenished in a drug box of each customer to a person in charge of visit when replenishing an arrangement drug in a drug box arranged in a home or an office using a drug arrangement service. The drug arrangement service is a service in which a drug box is placed in a customer's home and the customer pays for drugs as much as used. The product proposal device 100 can transmit an arrangement drug candidate to be arranged for each customer to the person-in-charge terminal 200 possessed by the person in charge of visiting each customer's home through a network.

It is assumed that, for example, an application program for using the drug arrangement service is installed in advance in the person-in-charge terminal 200 and the customer terminal 300. A list of arrangement drugs for a customer in charge and information indicating a usage status of arrangement drugs are input to the application program of the person-in-charge terminal 200. A list of arrangement drugs arranged in the drug box of the customer and information indicating a usage status of arrangement drugs are input to the application program of the customer terminal 300. In addition, the customer terminal 300 is used for the customer to input information on an arrangement drug desired to be brought at the next visit or a drug to be purchased through the application program.

Figure 2:
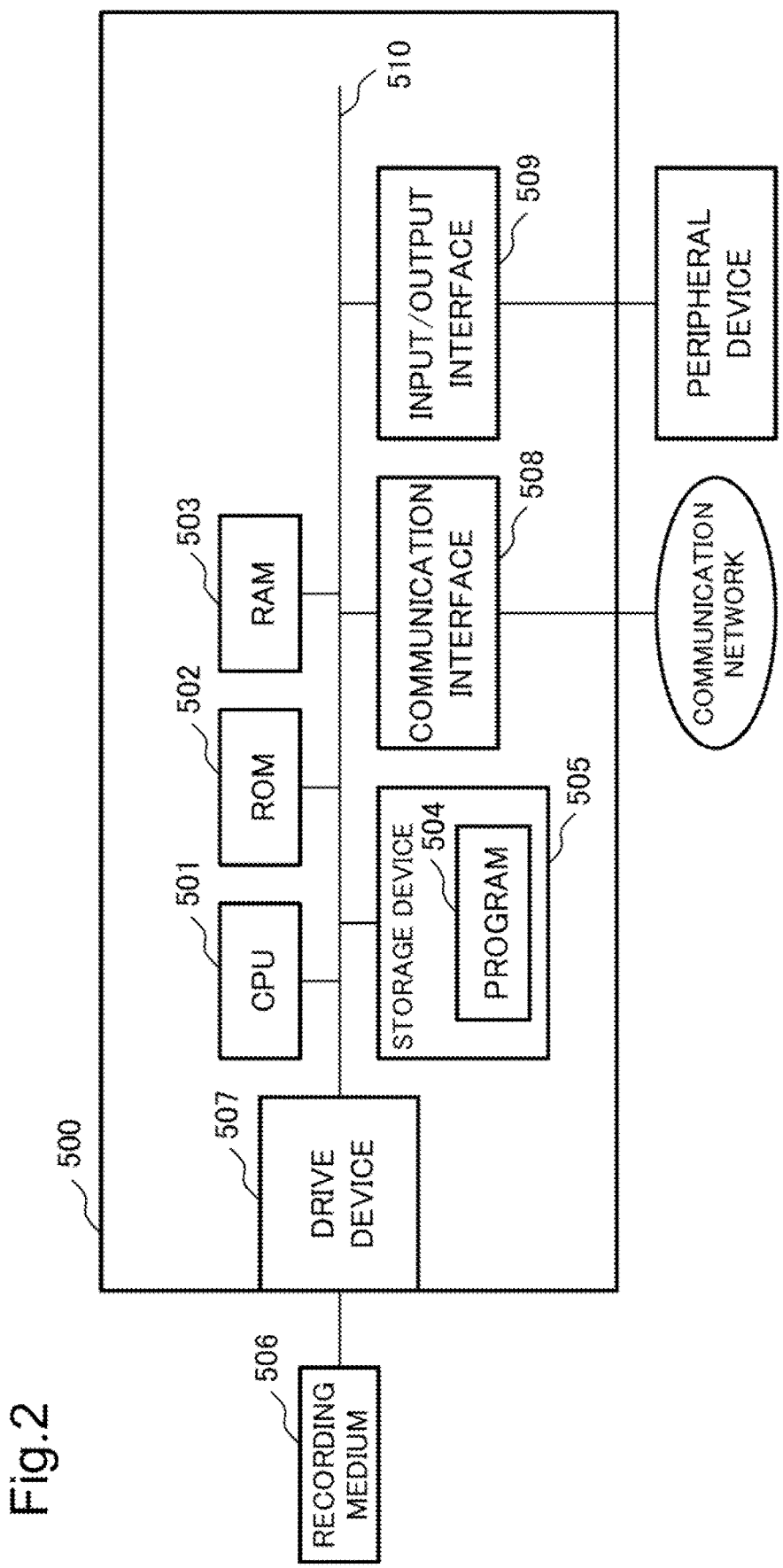
FIG. 2 is a diagram illustrating a hardware configuration in which the product proposal device according to the first example embodiment is implemented by a computer device and its peripheral device.

FIG. 2 is a diagram illustrating an example of a hardware configuration in which the product proposal device 100 according to the first example embodiment of the present disclosure is implemented by a computer device 500 including a processor. As illustrated in FIG. 2, the product proposal device 100 includes memories such as a central processing unit (CPU) 501, a read only memory (ROM) 502, and a random access memory (RAM) 503, a storage device 505 that stores a program 504 such as a hard disk, a communication interface 508 for network connection, and an input/output interface 509 that inputs and outputs data.

In the first example embodiment, the components of the product proposal device 100 are connected to each other, for example, via a bus 510. In addition, the product proposal device 100 according to the first example embodiment illustrated in FIG. 1 may be configured by cloud computing or the like.

The CPU 501 operates an operating system to control the product proposal device 100 according to the first example embodiment of the present invention over all. In addition, the CPU 501 reads a program or data from a recording medium 506 mounted on, for example, a drive device 507 to a memory. In addition, the CPU 501 functions as the information acquisition unit 101, the proposal unit 102, and the output unit 103, or some of them in the first example embodiment, and executes a process or a command of a flowchart illustrated in FIG. 5 to be described below based on the program.

The recording medium 506 is, for example, an optical disk, a flexible disk, a magnetic optical disk, an external hard disk, a semiconductor memory, or the like. The semiconductor memory or the like, which is one of recording media is a non-volatile storage device, records the program therein. Alternatively, the program may be downloaded from an external computer connected to a communication network although not illustrated.

As described above, the first example embodiment illustrated in FIG. 1 is implemented by the computer hardware illustrated in FIG. 2. However, the means for implementing each of the units included in the product proposal device 100 of FIG. 1 is not limited to the configuration described above. In addition, the product proposal device 100 may be implemented by one physically coupled device, or may be implemented by two or more physically separated devices by connecting the plurality of devices to each other in a wired or wireless manner. The product proposal device 100 may further include a display device such as a display. In addition, the product proposal device 100 and the display device may be configured as a system implemented by separate devices.

The information acquisition unit 101 is a means configured to acquire a usage status of arrangement drugs arranged in a customer's home and a drug purchase history. In the present example embodiment, the customer is a customer who uses a drug arrangement service and keeps a drug box of a company that provides the drug arrangement service in a home, an office, or the like.

In the present example embodiment, the arrangement drug and the drug include a medicine, a sanitary aid, a health food, a food for specified health uses, or a nutritional functional food such as a supplement. In addition, the arrangement drug refers to a drug in a drug box kept by a customer or a drug handled as an arrangement drug. In addition, the usage status of arrangement drugs includes information indicating whether each arrangement drug in the drug box is opened, a remaining amount of each arrangement drug, or a usage frequency of each arrangement drug. The remaining amount is, for example, information indicating how many percent of the total amount of the drug remains. The usage frequency is information indicating a frequency at which the customer takes each arrangement drug, such as daily or 2 or 3 times a week. The information acquisition unit 101 may acquire the usage status of arrangement drugs input to the person-in-charge terminal 200 by the person in charge of visit or the usage status of arrangement drugs input to the customer terminal 300 by the customer.

In the present example embodiment, the drug includes, not only the drug purchased as an arrangement drug by the customer, but also a drug purchased separately from the drug arrangement service from the person in charge of visit, a drug purchased at a store or an electronic commerce (EC) site, or a drug purchased in accordance with a prescription issued from a hospital. The drug may include a drug that can be purchased both under a drug arrangement service and in a store, an EC site, or the like (which may hereinafter be referred to as "a store or the like"), and may also include a drug that can be purchased only under the drug arrangement service or in the store.

The information acquisition unit 101 acquires a drug purchase history, for example, from electronic payment information or electronic receipt information of the customer. The electronic payment information or the electronic receipt information is stored, for example, in the storage device 505. The information acquisition unit 101 may acquire the purchase history information input onto the application program by the customer. The purchase history includes information such as a frequency at which the customer purchases a specific drug or a specific category of drug, or a final purchase date of the drug. The information acquisition unit 101 outputs the acquired usage status of arrangement drugs and the acquired drug purchase history to the proposal unit 102.

The proposal unit 102 is a means configured to propose arrangement drugs to be arranged in the customer's home based on the usage status and the purchase history. For example, in a case where a specific arrangement drug is not purchased by a store or the like even when the specific arrangement drug does not remain or remains in a predetermined amount or less, the proposal unit 102 proposes the arrangement drug or an arrangement drug of the same category. Here, the arrangement drug category or the drug category is a category into which the arrangement drug or drug is classified by purpose of use, such as cold drug, gastrointestinal drug, intestinal regulation/constipation drug, external drug for skin, eye drop, or supplement. In addition, the arrangement drug or drug may be classified by efficacy, such as cough drug.

In addition, in a case where a specific arrangement drug is not purchased by a store or the like even when the specific arrangement drug is used as frequently as a predetermined number of times or more and is likely to be used up within a short period of time, the proposal unit 102 proposes the arrangement drug or an arrangement drug of the same category. In addition, the proposal unit 102 may propose a specific arrangement drug at a timing when the specific arrangement drug remains in a predetermined amount or less or at a specific timing, in accordance with a predetermined rule.

For an arrangement drug that is used at a predetermined frequency or less or in a predetermined amount or less, the proposal unit 102 may propose another arrangement drug of the same category. In addition, if a drug has been purchased by the customer at a store or the like as frequently as a predetermined number of times or more, the proposal unit 102 may propose the drug or a similar drug as an arrangement drug. The similar drug is, for example, a drug having the same efficacy but a different product name. In the storage device 505, drugs similar to each other are associated with each other and stored as a similar list. The proposal unit 102 may extract and propose a drug that the customer has purchased as frequently as a predetermined number of times or more and a similar drug associated therewith in the similar list as arrangement drugs. In this case, by providing the drug purchased by the customer at the store or the like under the drug arrangement service, more arrangement drugs can be used by the customer. When proposing arrangement drugs to be arranged in the customer's home, the proposal unit 102 outputs a list of the proposed arrangement drugs to the output unit 103.

The output unit 103 is a means configured to output the list of the proposed arrangement drugs. In a case where a timing at which the person in charge of visit visits the customer's home is determined in advance, the output unit 103 may output a list of arrangement drugs before the visit (e.g., several hours to several days before the visit) to the person-in-charge terminal 200 as a mail or a message. Furthermore, the output unit 103 may periodically output a list of arrangement drugs on the application program so that the person in charge of visit accesses the list. In addition, the output unit 103 may output a list of arrangement drugs when the person in charge of visit presses a button for creating a list of arrangement drugs on the application program as a trigger.

FIGS. 3 and 4 are examples of a screen on which a list of arrangement drugs is output in the first example embodiment. In the example of FIG. 3, product names of the arrangement drugs and categories thereof are displayed. In addition, as illustrated in FIG. 4, the output unit 103 may display reasons why the arrangement drugs are arranged. In FIG. 4, the "change of product" indicates that, in a case where there is an arrangement drug that is less used than predetermined, the arrangement drug is changed to another product of the same category. The "exchange of product" indicates that, in a case where there is an arrangement drug of which an expiration date is approaching or has passed, the arrangement drug is replenished with a new product of the same kind. The "replenishment of product" indicates that, in a case where an arrangement drug does not remain or an arrangement drug remains in a predetermined amount or less, the arrangement drug is replenished with a product of the same kind.

An operation of the product proposal device 100 configured as described above will be described with reference to a flowchart of FIG. 5.

Figure 5:
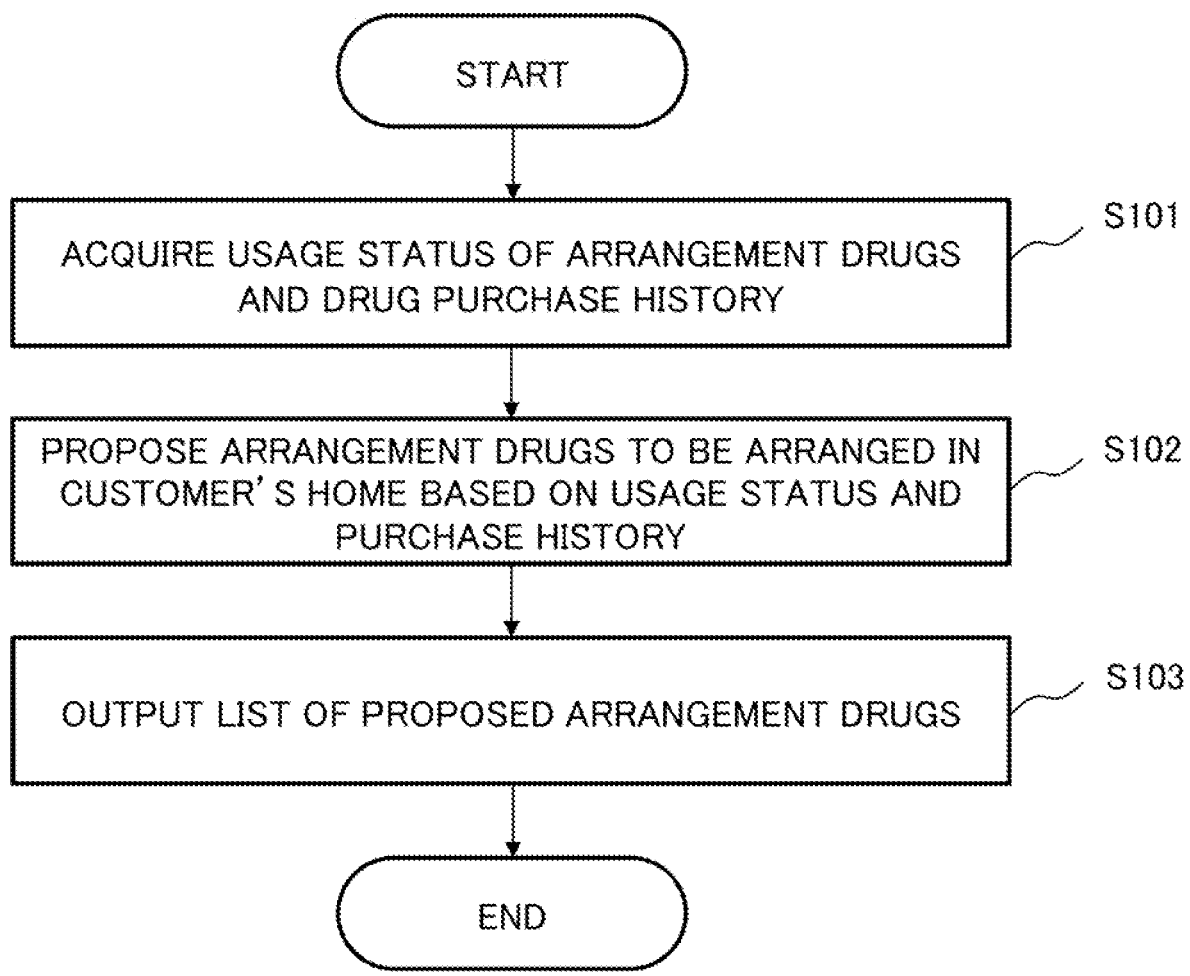
FIG. 5 is a flowchart illustrating a product proposal operation according to the first example embodiment.

FIG. 5 is a flowchart illustrating an outline of an operation of the product proposal device 100 according to the first example embodiment. Note that the process according to this flowchart may be executed based on the program control by the processor described above.

As illustrated in FIG. 5, first, the information acquisition unit 101 acquires a usage status of arrangement drugs arranged in a customer's home and a drug purchase history (step S101). Next, the proposal unit 102 proposes arrangement drugs to be arranged in the customer's home based on the usage status and the purchase history (step S102). The output unit 103 outputs a list of the proposed arrangement drugs (step S103). Then, the product proposal device 100 ends the operation.

In the present example embodiment, the output unit 103 outputs a list of arrangement drugs to be arranged in the customer's home as proposed based on the usage status and the purchase history. As a result, the person in charge of visit can replenish the arrangement drugs as output in the list of arrangement drugs, thereby causing the customer to use more arrangement drugs.

Modification of First Example Embodiment

Next, a modification of the first example embodiment of the present disclosure will be described with reference to the drawings, focused on a difference from the first example embodiment. Hereinafter, description overlapping with what has been described above will be omitted unless the omission obscures the description of the present example embodiment. The function of each component in each example embodiment of the present disclosure can be implemented not only by hardware similarly to the computer device illustrated in FIG. 2 but also by a computer device based on program control or software.

In the first example embodiment, it is assumed that a customer has a usage status of arrangement drugs and a drug purchase history. On the other hand, in the modification of the first example embodiment, it is assumed that a customer does not have a usage status of arrangement drugs and a drug purchase history when the customer newly uses the drug arrangement service. In this case, the information acquisition unit 101 acquires a usage status of arrangement drugs and a drug purchase history for another customer similar in at least one of family structure, age, and medical history. The information such as family structure, age, and medical history is information necessary for grasping types of arrangement drugs required at home. The family structure includes whether there is a child, whether there is a grandparent living together, and the like. The present modification is similar to the first example embodiment in how the information acquisition unit 101 acquires a usage status of arrangement drugs and a drug purchase history.

In the present modification, the proposal unit 102 proposes arrangement drugs to be arranged by a person in charge of visit in each customer's home based on a usage status of arrangement drugs and a drug purchase history for another customer. For example, the proposal unit 102 extracts, by arrangement drug category, an arrangement drug used by other customers in a predetermined quantity or more or a drug purchased by other customers in a predetermined quantity or more within a predetermined period. Then, the output unit 103 outputs a list of the extracted arrangement drugs to the person-in-charge terminal 200. In this case, the output unit 103 outputs product names of one or more arrangement drugs by category.

In addition, the proposal unit 102 may propose, by arrangement drug category, an arrangement drug most frequently used by other customers and a drug most frequently purchased by other customers, and the output unit 103 may output a list of the proposed arrangement drugs. In this case, the output unit 103 outputs a product name of one arrangement drug by category. Note that a timing when the list of the proposed arrangement drugs is output to the person-in-charge terminal 200 is similar to that in the first example embodiment.

Second Modification of First Example Embodiment

Next, another modification of the first example embodiment of the present disclosure will be described with reference to the drawings, focused on a difference from the first example embodiment. The present modification is a product proposal system including the product proposal device according to the present example embodiment.

Figure 6:
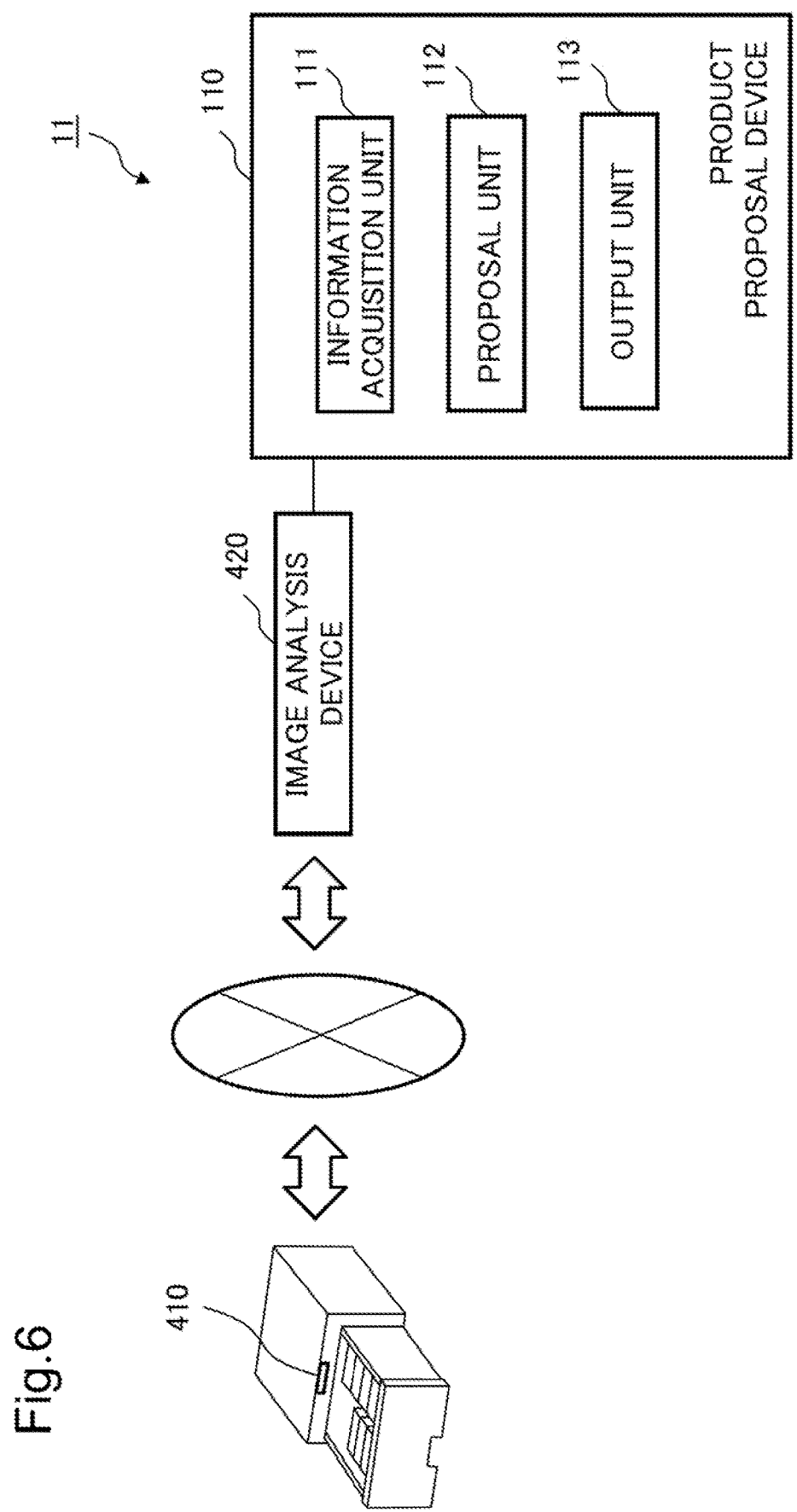
FIG. 6 is a block diagram illustrating a configuration of a product proposal system including a product proposal device according to a modification of the first example embodiment.

FIG. 6 is a functional block diagram illustrating an example of a functional configuration of a product proposal system 11 including a product proposal device 110 according to the present example embodiment. As illustrated in FIG. 6, the product proposal system 11 includes a product proposal device 110, a person-in-charge terminal 210 and a customer terminal 310, which are not illustrated, a camera 410 provided in a drug box in each customer's home, and an image analysis device 420. The product proposal device 110 included in FIG. 6 has a configuration similar to that of the product proposal device 100 described with reference to FIG. 1.

The camera 410 is provided in a drug box placed in each customer's home. The camera 410 is provided, for example, on an upper side of the drug box on the side where a drug is drawn out as illustrated in FIG. 6, but the location of the camera 410 is not limited thereto as long as what is contained in the drug box can be imaged. In addition, the drug box is not limited to the drawer type as illustrated in FIG. 6, and may be of an upper lid openable type. The camera 410 captures an image of the inside of the drug box while the drawer or the lid of the drug box is open, for example, for a customer to use an arrangement drug. The camera 410 may capture a moving image inside the drug box, or may capture a still image immediately before the drug box is closed or at a moment when a specific arrangement drug is picked up. The camera 410 transmits the captured image to the image analysis device 420.

The image analysis device 420 analyzes the image captured by the camera 410 and specifies a drug usage status of the customer. When receiving the image of the inside of the drug box captured while the drug box is open from the camera 410, the image analysis device 420 specifies a usage status of arrangement drugs in the customer's home, for example, by collating an image of the inside of the drug box captured immediately before the drug box is closed with an image of the inside of the drug box captured when arrangement drugs are replenished. The image of the inside of the drug box captured when arrangement drugs are replenished is an image of the inside of the drug box captured when the person in charge of visit most recently visits the customer's home and replenishes the arrangement drugs. The image analysis device 420 specifies a usage status such as whether each arrangement drug is opened and a remaining amount of each arrangement drug.

In addition, when receiving the image of the inside of the drug box captured while the drug box is open from the camera 410, the image analysis device 420 may specify a frequency at which the arrangement drug is used by the customer by counting the number of times the arrangement drug is picked up. In addition, the image analysis device 420 may estimate a remaining amount of a specific arrangement drug from the number of times the arrangement drug is picked up and a dose per one time. The image analysis device 420 transmits the specified usage status to the product proposal device 110. In addition, when the remaining amount or the estimated remaining amount of the arrangement drug is equal to or less than a predetermined value, the image analysis device 420 may notify the person-in-charge terminal 210 that the remaining amount of the arrangement drug remains is small.

Figure 7:
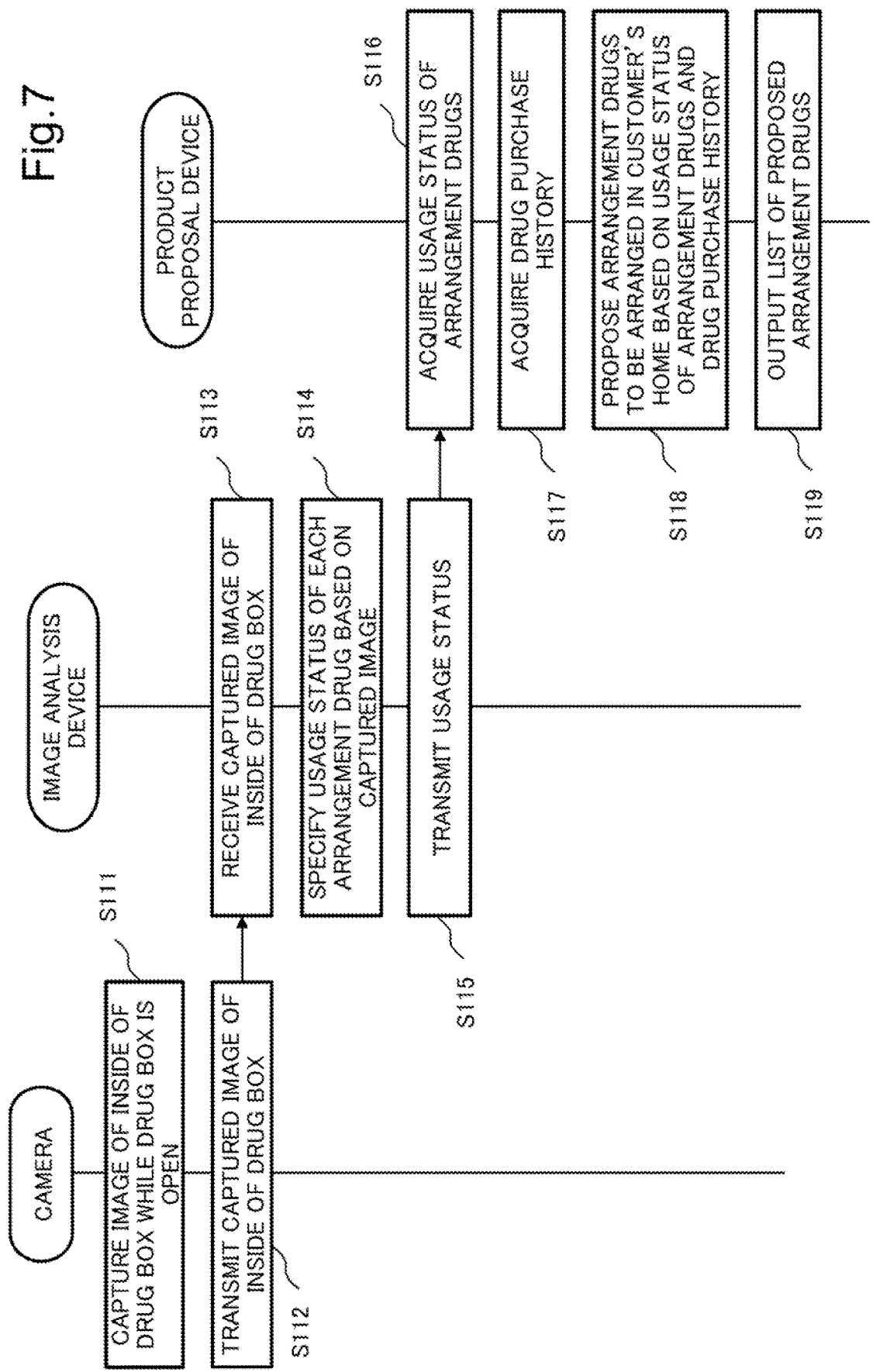
FIG. 7 is a flowchart illustrating a product proposal operation according to the modification of the first example embodiment.

FIG. 7 is a flowchart illustrating an outline of an operation of the product proposal system 11 according to the modification of the first example embodiment. Note that the process according to this flowchart may be executed based on the program control by the processor described above. The process according to this flowchart is executed, for example, at a timing when it is detected that a drug box in each customer's home is open.

As illustrated in FIG. 7, first, the camera 410 captures an image of the inside of the drug box while the drug box is open (step S111). Next, the imaging device transmits the captured image of the inside of the drug box to the image analysis device 420 (step S112). The image analysis device 420 receives the captured image of the inside of the drug box (step S113). Next, the image analysis device 420 specifies a usage status of each arrangement drug based on the captured image of the inside of the drug box (step S114), and transmits the usage status to the product proposal device 110 (step S115). In the product proposal device 110, the information acquisition unit 111 receives the usage status of arrangement drugs (step S116) and acquires a drug purchase history (step S117). Next, the proposal unit 112 proposes arrangement drugs to be arranged in the customer's home based on the usage status of arrangement drugs and the drug purchase history (step S118). Lastly, the output unit 113 outputs a list of the proposed arrangement drugs (step S119). Then, the product proposal system 11 ends the operation.

In the present example embodiment, in the product proposal system 11, the image analysis device 420 specifies a usage status of each arrangement drug based on the captured image of the inside of the drug box. As a result, the product proposal system 11 is capable of acquiring a usage status of arrangement drugs even though it is not input by the customer or the person in charge of visit.

Second Example Embodiment

Next, a second example embodiment of the present disclosure will be described in detail with reference to the drawings. Hereinafter, description overlapping with what has been described above will be omitted unless the omission obscures the description of the present example embodiment. The function of each component in each example embodiment of the present disclosure can be implemented not only by hardware similarly to the computer device illustrated in FIG. 2 but also by a computer device based on program control or software.

Figure 8:
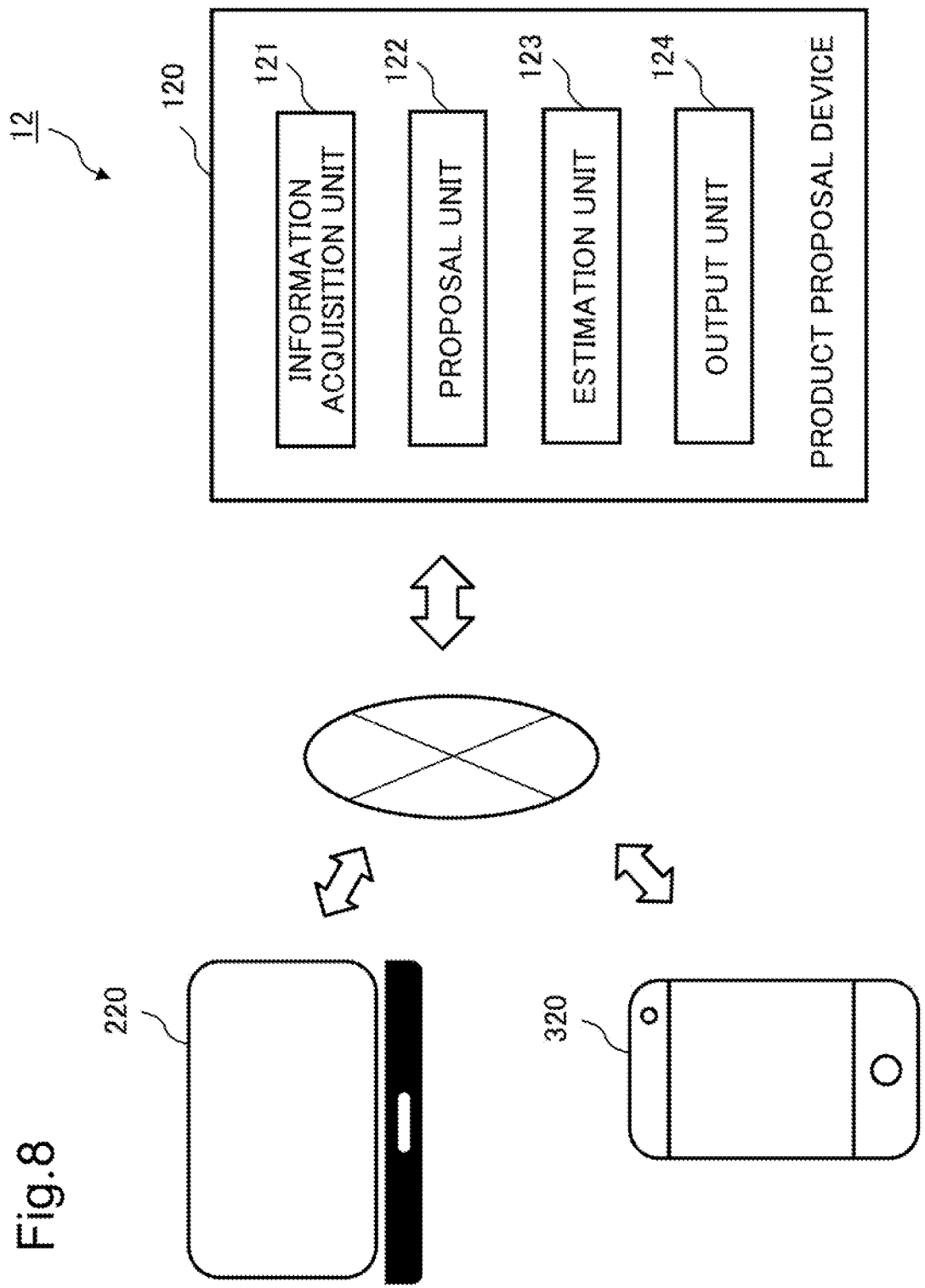
FIG. 8 is a block diagram illustrating a configuration of a product proposal system including a product proposal device according to a second example embodiment.

FIG. 8 is a functional block diagram illustrating an example of a product proposal system 12 including a product proposal device 120 according to the second example embodiment. With reference to FIG. 8, the product proposal device 120 according to the second example embodiment will be described, focused on a difference from the product proposal device 100 according to the first example embodiment.

The product proposal device 120 includes an information acquisition unit 121, a proposal unit 122, an estimation unit 123, and an output unit 124.

Similarly to the information acquisition unit 101, the information acquisition unit 121 acquires a usage status of arrangement drugs and a drug purchase history. In addition, the information acquisition unit 121 acquires a usage status by arrangement drug category and a purchase history by drug category. The information acquisition unit 121 outputs the acquired usage status and purchase history to the proposal unit 122. In addition, the information acquisition unit 121 outputs the usage status by arrangement drug category and the purchase history by drug category to the estimation unit 123.

Similarly to the proposal unit 102, the proposal unit 122 proposes arrangement drugs to be arranged in the customer's home based on the usage status and the purchase history.

The estimation unit 123 is a means configured to estimate a disorder that the customer has based on the usage status by arrangement drug category and the purchase history by drug category. For example, when a usage quantity of a specific category of arrangement drug or a purchase quantity of a specific category of drug is equal to or more than a predetermined value, the estimation unit 123 estimates a disorder that the customer has from the category. In the storage device 505, for example, a relationship between a category of a drug, a reference value of a usage status of the drug, and a disorder assumed when the drug is taken as much as a reference value or more is stored in association with each other in advance. Based on the relationship therebetween, when the customer takes a specific category of drug as much as the reference value or more, the estimation unit 123 estimates that the customer has an associated disorder. The estimation unit 123 may estimate a disorder using a machine learning model that has learned such relationships. For example, when a usage quantity or a purchase quantity of vitamins effective for rough skin is equal to or more than a predetermined value, the estimation unit 123 estimates that the customer has rough skin. In addition, the estimation unit 123 may estimate a disorder that the customer has from a category in which an arrangement drug usage frequency or a drug purchase frequency is equal to or more than a predetermined value. The estimation unit 123 outputs the estimated disorder of the customer to the proposal unit 122.

In the present example embodiment, the proposal unit 122 further proposes a product for remedying the estimated disorder. Here, the product includes a cosmetic product or a food product as well as a drug. For example, when the estimation unit 123 estimates that the customer has rough skin, the proposal unit 122 recommends a cosmetic product effective for the rough skin or a cosmetic product hiding the rough skin.

The output unit 124 outputs, to the person-in-charge terminal 220, information on a product recommended to the customer for remedying the estimated disorder, in addition to the list of arrangement drugs. FIG. 9 is an example of a screen output by the output unit 124 in the second example embodiment. As illustrated in FIG. 9, the output unit 124 outputs a list of arrangement drugs together with information b on a product for remedying an estimated disorder. In the example of FIG. 9, recommendation of a cosmetic product effective for rough skin or a cosmetic product hiding rough skin is displayed as information on a product for remedying a disorder.

An operation of the product proposal device 120 configured as described above will be described with reference to a flowchart of FIG. 10.

Figure 10:
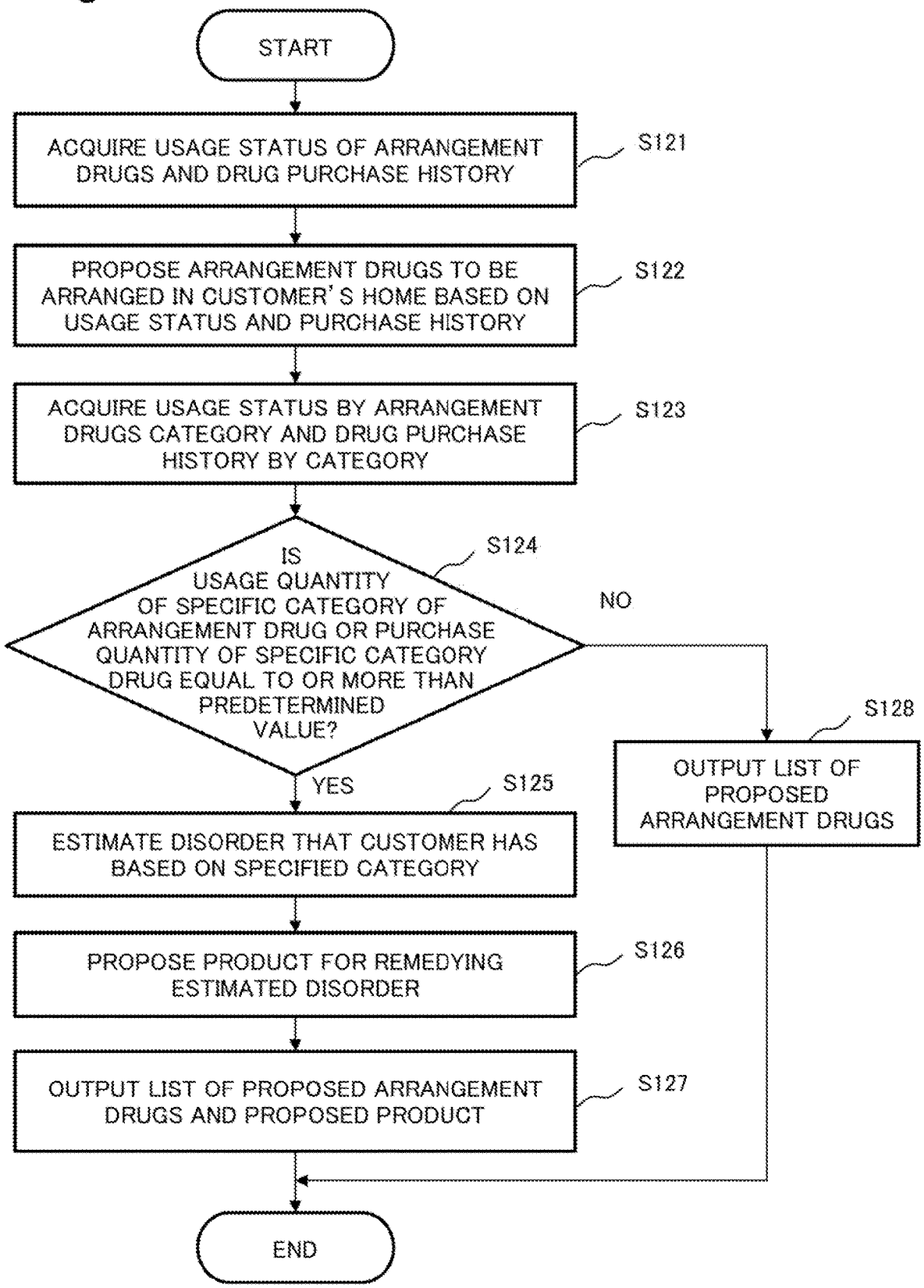
FIG. 10 is a flowchart illustrating a product proposal operation according to the second example embodiment.

FIG. 10 is a flowchart illustrating an outline of an operation of the product proposal device 120 according to the second example embodiment. Note that the process according to this flowchart may be executed based on the program control by the processor described above.

As illustrated in FIG. 10, first, the information acquisition unit 121 acquires a usage status of arrangement drugs and a drug purchase history (step S121). Next, the proposal unit 122 proposes arrangement drugs to be arranged in the customer's home based on the usage status and the purchase history (step S122). Next, the information acquisition unit 121 acquires a usage status by arrangement drug category and a purchase history by drug category (step S123). When a usage quantity of a specific category of arrangement drug or a purchase quantity of a specific category of drug is equal to or more than a predetermined value (S124; YES), the estimation unit 123 estimates a disorder that the customer has based on the specified category (step S125). Next, the proposal unit 122 proposes a product for remedying the estimated disorder (step S126). Next, the output unit 124 outputs a list of the proposed arrangement drugs and the proposed product to the person-in-charge terminal 220 (step S127). On the other hand, in the step S124, when the usage quantity of the specific category of arrangement drug or the purchase quantity of the specific category of drug is not equal to or more than the predetermined value (S124; NO), the output unit 124 outputs the list of proposed arrangement drugs to the person-in-charge terminal 220 (step S128). Then, the product proposal device 120 ends the operation.

In the product proposal device 120 according to the second example embodiment, the output unit 124 outputs, to the person-in-charge terminal 220, information on a product recommended to the customer in order to remedy the estimated disorder. As a result, a product that is likely to be purchased by customer can be recommended.

Third Example Embodiment

Next, a third example embodiment of the present disclosure will be described in detail with reference to the drawings. Hereinafter, description overlapping with what has been described above will be omitted unless the omission obscures the description of the present example embodiment. The function of each component in each example embodiment of the present disclosure can be implemented not only by hardware similarly to the computer device illustrated in FIG. 2 but also by a computer device based on program control or software.

Figure 11:
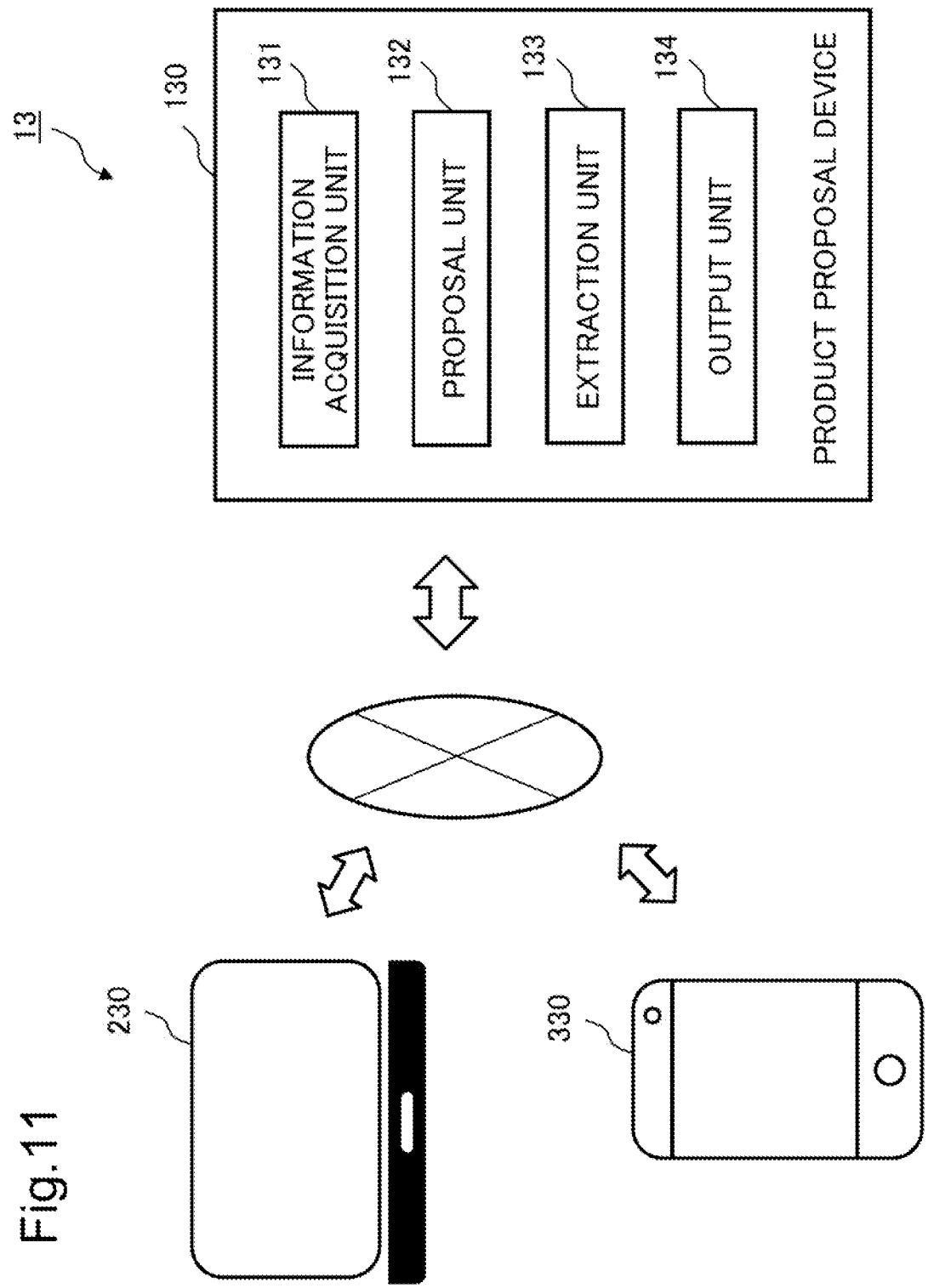
FIG. 11 is a block diagram illustrating a configuration of a product proposal system including a product proposal device according to a third example embodiment.

FIG. 11 is a functional block diagram illustrating an example of a product proposal system 13 including a product proposal device 130 according to the third example embodiment. With reference to FIG. 11, the product proposal device 130 according to the third example embodiment will be described, focused on a difference from the product proposal device 100 according to the first example embodiment.

The product proposal device 130 includes an information acquisition unit 131, a proposal unit 132, an extraction unit 133, and an output unit 134.

Similarly to the information acquisition unit 101, the information acquisition unit 131 acquires a usage status of arrangement drugs and a drug purchase history. The information acquisition unit 131 outputs the acquired usage status and purchase history to the proposal unit 132. In addition, similarly to the proposal unit 102, the proposal unit 132 proposes arrangement drugs to be arranged in the customer's home based on the usage status and the purchase history.

The extraction unit 133 extracts an arrangement drug candidate for replenishing an arrangement drug that has been replenished as frequently as a predetermined number of times or more, among the proposed arrangement drugs. The candidate for replenishment is an arrangement drug that is expected not to be all taken until its expiration date by another customer and to be discarded for the passing of the expiration date. When, among the proposed arrangement drugs, there is an arrangement drugs that has been replenished, for example, several times or more within a predetermined period (within one year), the extraction unit 133 extracts the same type of arrangement drug stored by another customer with an expiration date thereof being within a predetermined period.

The output unit 134 outputs the arrangement drug that has been replenished as frequently as a predetermined number of times or more as a candidate for replenishing the arrangement drug. In a case where there are a plurality of candidates for replenishment, the output unit 134 may change a color of a portion indicating information on an arrangement drug of which a remaining amount is largest or an arrangement drug of which an expiration date is nearest to highlight the portion. In addition, in a case where there are a plurality of candidates for replenishment, the output unit 134 may display the candidates in order of large remaining amount or in order of near expiration date. FIG. 12 is an example of a screen output by the output unit 134 in the third example embodiment. As illustrated in FIG. 12, the output unit 134 outputs a list a of arrangement drugs together with candidates c for replenishing an arrangement drug stored by other customers. In the example of FIG. 12, information on the supplements F of customers C and D as candidates for replenishing supplement F of customer B and their expiration dates are displayed.

An operation of the product proposal device 130 configured as described above will be described with reference to a flowchart of FIG. 13.

Figure 13:
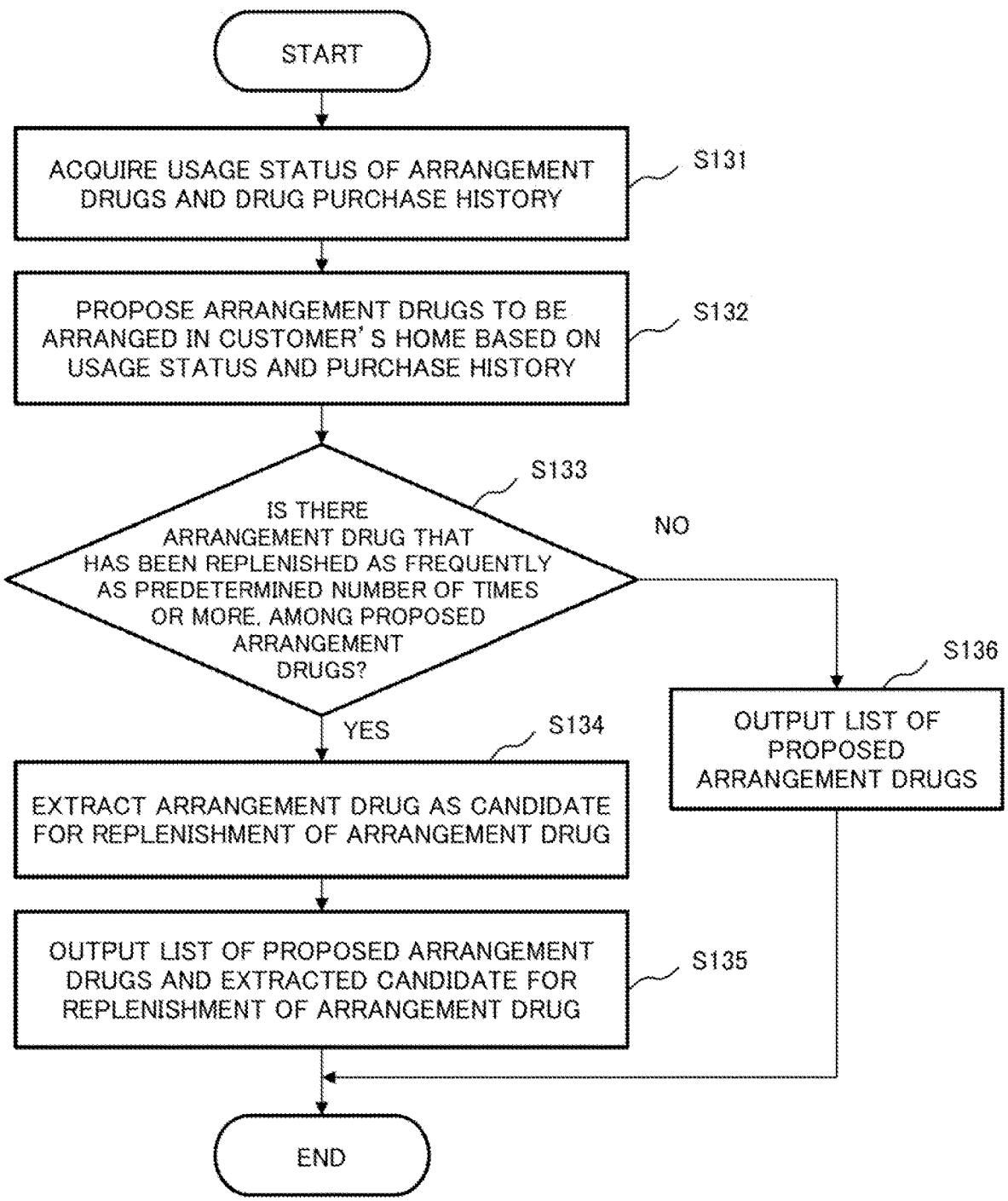
FIG. 13 is a flowchart illustrating a product proposal operation according to the third example embodiment.

FIG. 13 is a flowchart illustrating an outline of an operation of the product proposal device 130 according to the third example embodiment. Note that the process according to this flowchart may be executed based on the program control by the processor described above.

As illustrated in FIG. 13, first, the information acquisition unit 131 acquires a usage status of arrangement drugs and a drug purchase history (step S131). Next, the proposal unit 132 proposes arrangement drugs to be arranged in the customer's home based on the usage status and the purchase history (step S132). Next, when, among the proposed arrangement drugs, there is an arrangement drugs that has been replenished as frequently as a predetermined number of times or more (S133; YES), the extraction unit 133 extracts an arrangement drug candidate for replenishing the arrangement drug (step S134). Next, the output unit 134 outputs a list of the proposed arrangement drugs and the extracted candidate for replenishing the arrangement drug (step S135). On the other hand, in the step S133, when, among the proposed arrangement drugs, there is no arrangement drugs that has been replenished as frequently as a predetermined number of times or more (S133; NO), the output unit 134 outputs a list of the proposed arrangement drugs (step S136). Then, the product proposal device 130 ends the operation.

In the product proposal device 130 according to the third example embodiment, the output unit 134 extracts an arrangement drug candidate for replenishing an arrangement drug that has been replenished as frequently as a predetermined number of times or more. As a result, it is possible to reduce a waste loss of an arrangement drug that is discarded after its expiration date.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, although a plurality of operations are described in order in the form of a flowchart, the order in which the operations are described does not limit an order in which the plurality of operations are executed. Therefore, when each example embodiment is implemented, the order in which the plurality of operations are executed can be changed within a range that does not interfere with the content.

A customer purchases a drug at a store or in accordance with a prescription, as well as under a drug arrangement service. In the method disclosed in JP 2021-099759 A, a person in charge of visit, who replenishes arrangement drugs as much as used or purchased by a customer, may not be able to grasp what types of arrangement drugs are to be replenished to a drug box in a customer's home to cause the customer to use more arrangement drugs.

An example of the effect of the present invention is to provide a product proposal device capable of causing customers to use more arrangement drugs.

The invention claimed is:

1. A product proposal system comprising:
a drug box for storing arrangement drugs arranged in a customer's home;
a camera capturing an image of an inside of the drug box while the drug box is open, wherein the camera is provided in the drug box where the camera can capture the image;
an image analysis device comprising:
a first memory storing first instructions; and
one or more first processors configured to execute the first instructions to:
receive the image of the inside of the drug box from the camera;
specify usage status of the arrangement drugs based on the image; and
transmit the usage status to a product proposal device; and
a second memory storing instruction; and
one or more second processors configured to execute the second instructions to:
acquire the usage status of the arrangement drugs and a drug purchase history;
propose arrangement drugs to be arranged in the customer's home based on the usage status and the purchase history; and
output a list of the proposed arrangement drugs.

2. The product proposal device according to claim 1, wherein the one or more second processors are further configured to execute the second instructions to
propose another arrangement drug in the same category as the arrangement drug when there is an arrangement drug that has been used less than predetermined usage status.

3. The product proposal device according to claim 1, wherein the one or more second processors are further configured to execute the second instructions to acquire a usage status of arrangement drugs and a drug purchase history for another customer similar in at least one of family structure, age, and medical history when there is no the usage status of arrangement drugs and no the drug purchase history in the customer's home, and propose the arrangement drugs based on the usage status and the purchase history for the another customer.

4. The product proposal device according to claim 1, wherein the one or more second processors are further configured to execute the second instructions to acquire a usage status by arrangement drug category and a purchase history by drug category, when a usage quantity of a specific category of arrangement drug or a purchase quantity of a specific category of drug is equal to or more than a predetermined value, estimate a disorder that a customer has based on the specified category, propose a product for remedying the estimated disorder, and output information on the proposed product.

5. The product proposal device according to claim 1, wherein the one or more second processors are further configured to execute the second instructions to extract an arrangement drug stored by another customer with an expiration date thereof being within a predetermined period in the same type when the frequency of replenishing the proposed placement medicine is more than a predetermined number of times, and output the extracted arrangement drug of the same type as a candidate for replenishment.

6. A product proposal method comprising:

capturing, by a camera, an image of an inside of a drug box while the drug box is open, wherein the drug box for storing arrangement drugs arranged in a customer's home, and the camera is provided in the drug box where the camera can capture the image;

receiving, by an image analysis device, the image of the inside of the drug box from the camera;

specifying, by the image analysis device, usage status of the arrangement drugs based on the image;

transmitting, by the image analysis device, the usage status to a product proposal device;

acquiring, by a product proposal device, the usage status of the arrangement drugs arranged and a drug purchase history;

proposing, by the product proposal device, arrangement drugs to be arranged in the customer's home based on the usage status and the purchase history; and outputting, by the product proposal device, a list of the proposed arrangement drugs.

* * * * *